G. NEUDECKER.
LIQUID MEASURING AND REGISTERING APPARATUS.
APPLICATION FILED MAR. 8, 1911.
1,012,696.
Patented Dec. 26, 1911.
5 SHEETS—SHEET 4.
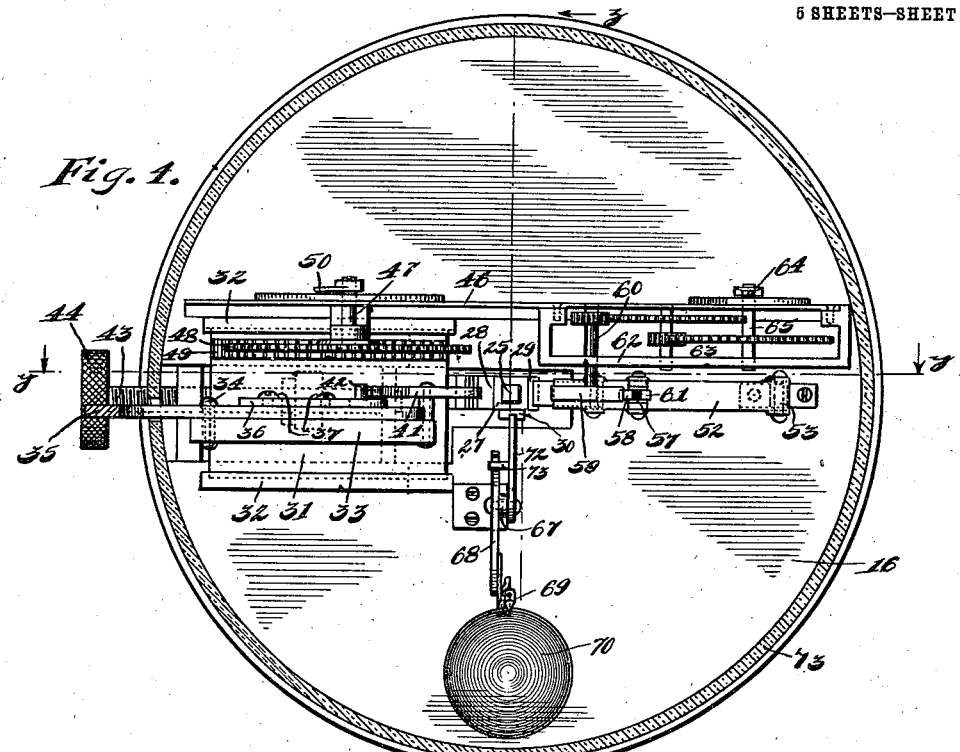
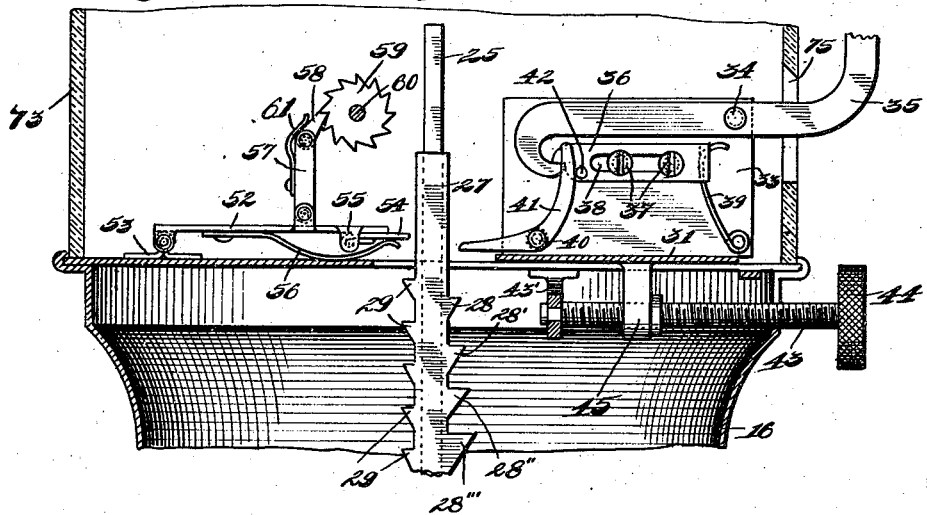
Witnesses:
C. E. Wessels.
A. A. Olson.
Inventor:
Gottlieb Neudecker,
By Joshua R. H. Potts
his Attorney.

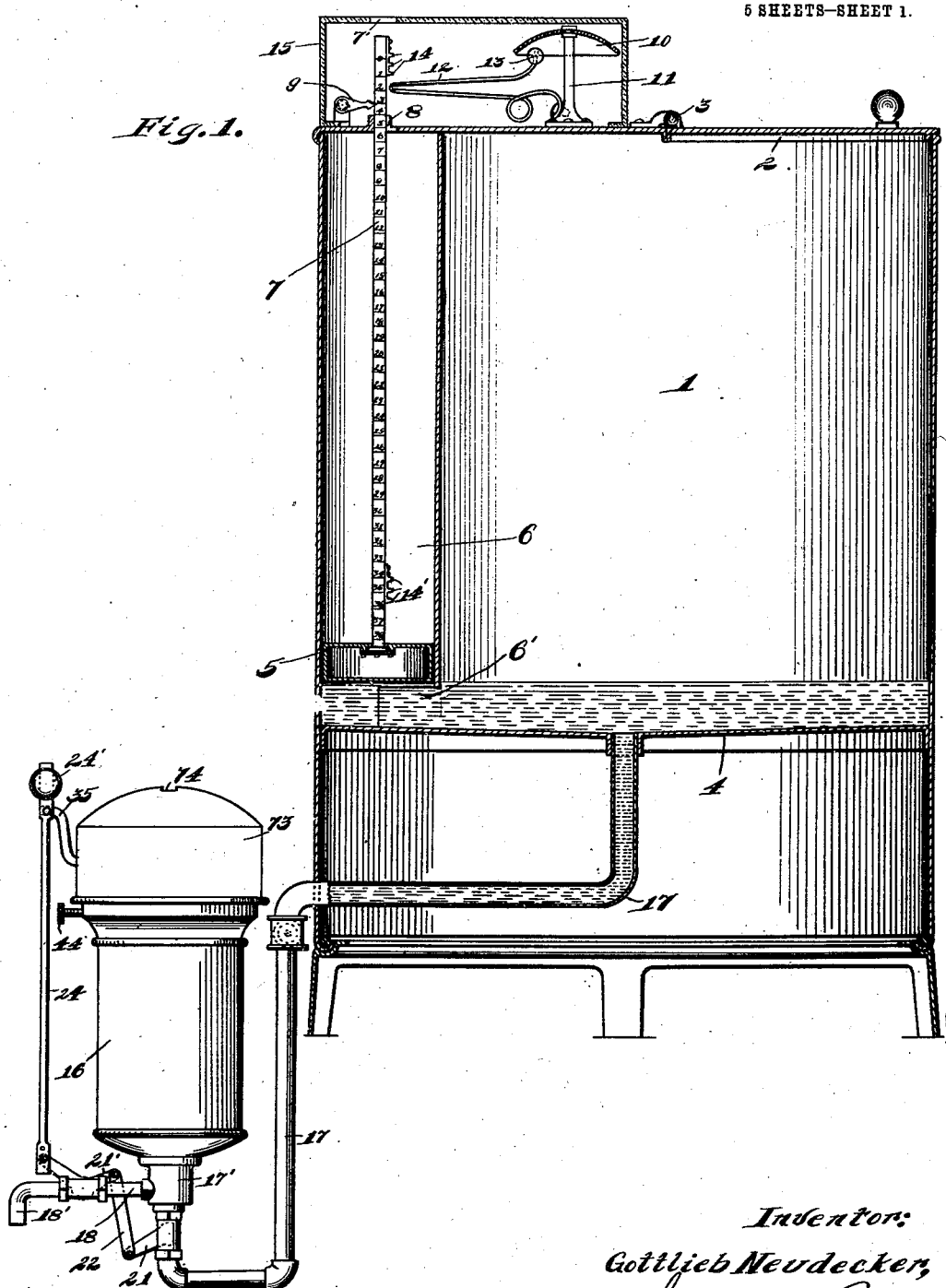

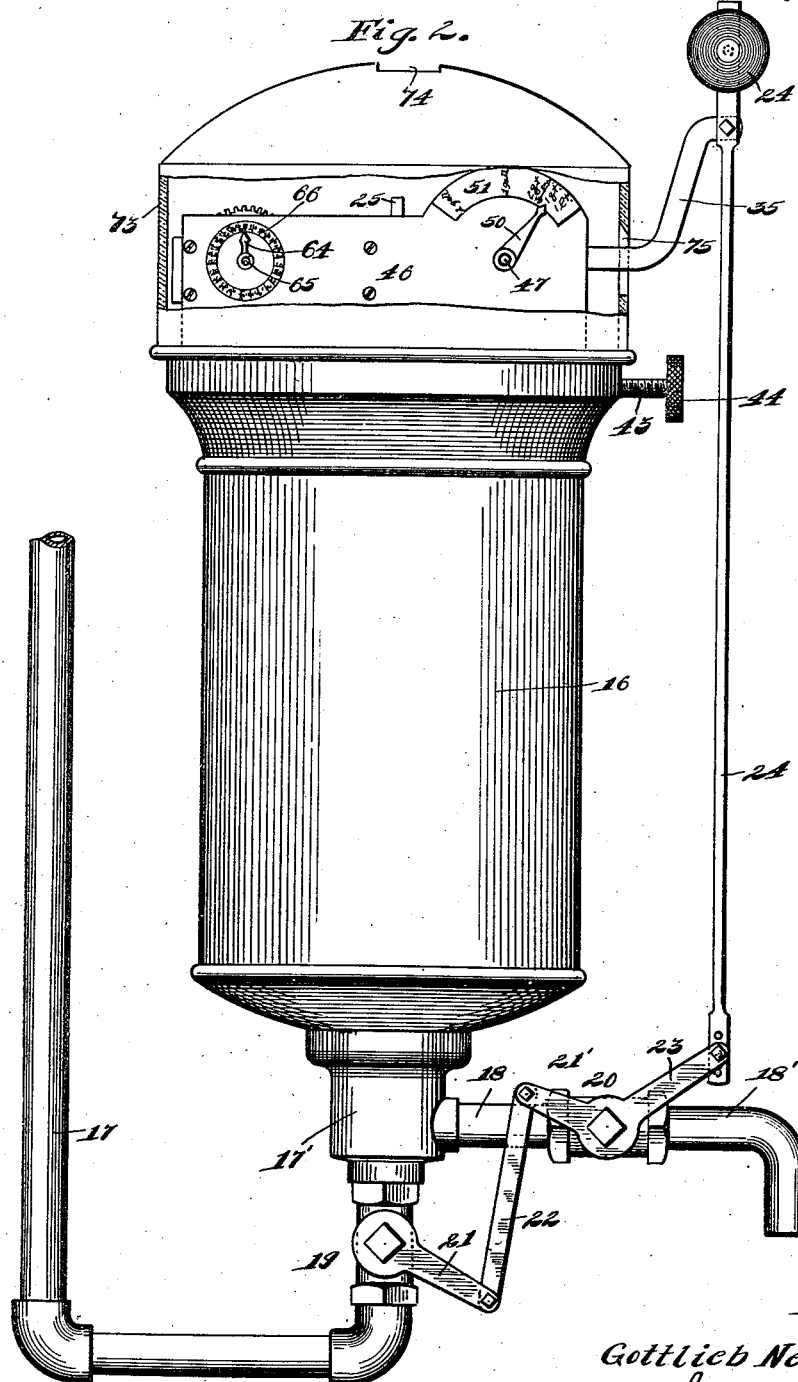

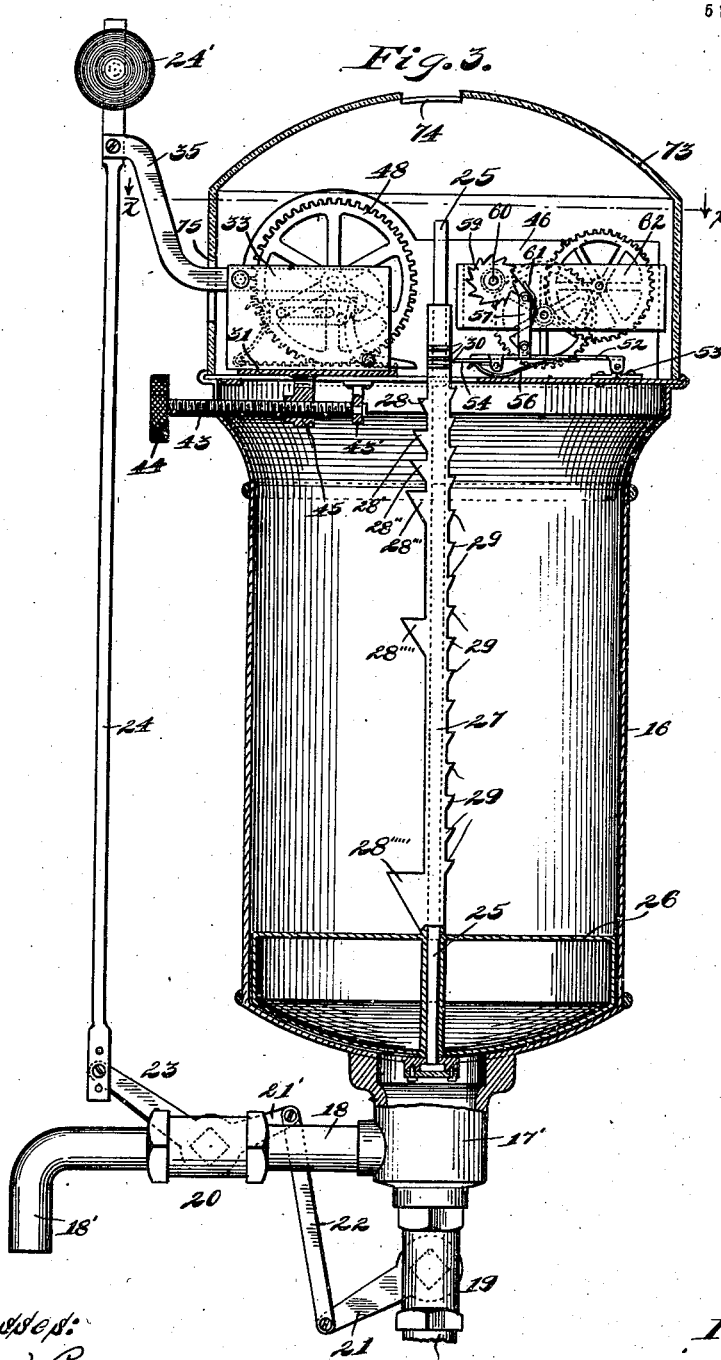

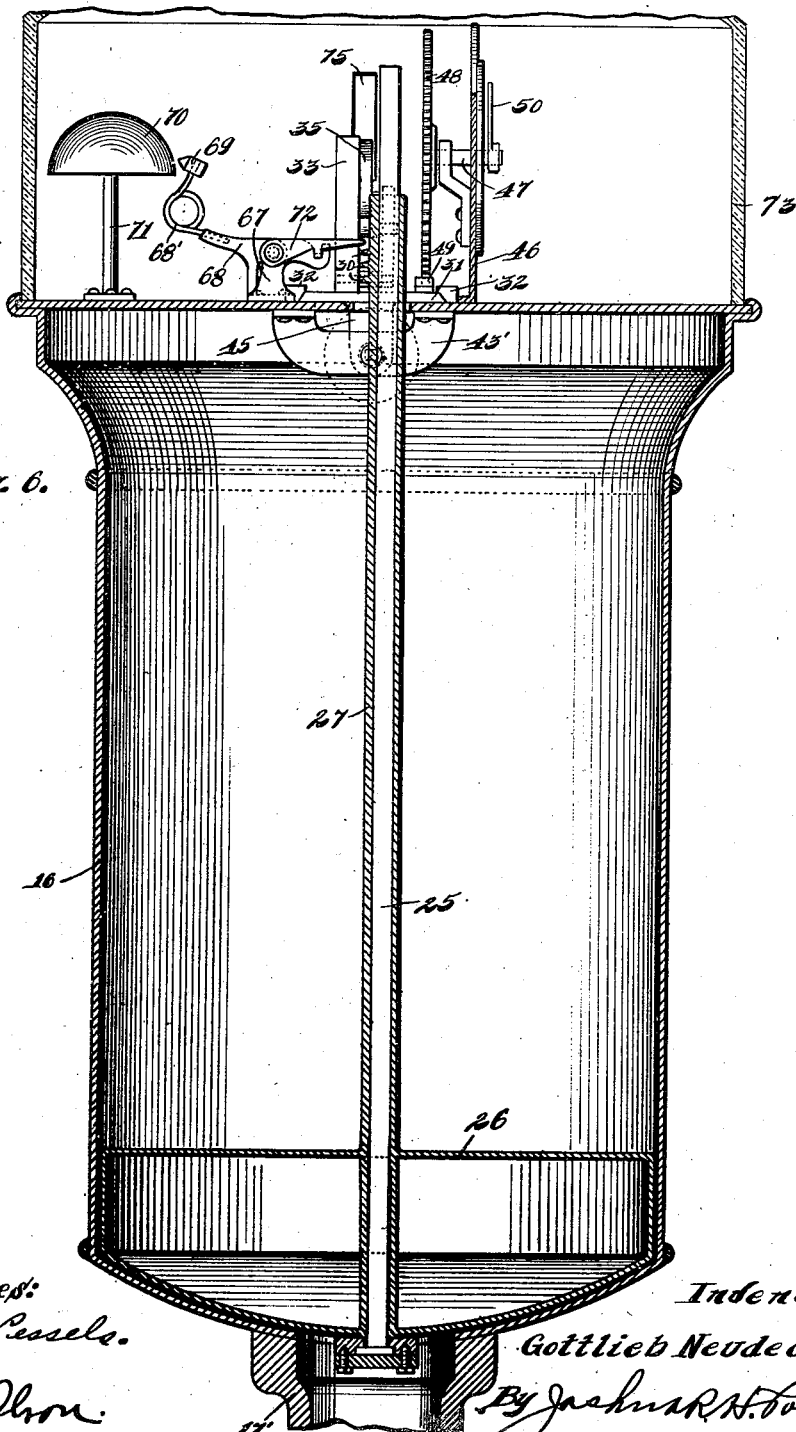

UNITED STATES PATENT OFFICE.

GOTTLIEB NEUDECKER, OF SYCAMORE, ILLINOIS.

LIQUID MEASURING AND REGISTERING APPARATUS.

1,012,696.　　　　　Specification of Letters Patent.　　Patented Dec. 26, 1911.

Application filed March 8, 1911. Serial No. 613,149.

*To all whom it may concern:*

Be it known that I, GOTTLIEB NEUDECKER, a citizen of the United States, residing at Sycamore, county of Dekalb, and State of Illinois, have invented certain new and useful Improvements in Liquid Measuring and Registering Apparatus, of which the following is a specification.

My invention relates to improvements in liquid measuring and registering apparatus and has for its object the production of an apparatus of this character which will be of improved construction and efficient in operation.

Other objects will appear hereinafter.

With these objects in view my invention consists in a liquid measuring and registering apparatus characterized as above mentioned and in certain details of construction and arrangement of parts as will be hereinafter fully described and more particularly pointed out in the appended claims.

My invention will be more readily understood by reference to the accompanying drawings forming a part of this specification, and in which, Figure 1 is a partially sectional side elevation of an apparatus embodying the invention, the liquid reservoir being shown in section, Fig. 2 is a side elevation of the dispensing tank, the protecting dome at the upper end of said tank being broken away in order to expose underlying parts, Fig. 3 is a central vertical section of the construction shown in Fig. 2, Fig. 4 is an enlarged transverse section taken on line x—x of Fig. 3, Fig. 5 is a fragmentary section taken on substantially line y—y of Fig. 4, and Fig. 6 is a vertical section taken on substantially line z—z of Fig. 4.

The preferred form of my construction as illustrated in the drawings comprises a reservoir 1 which is preferably cylindrical in form and constructed of sheet metal. The upper end of the reservoir 1 is closed, a door or closure 2 being provided in said end through which access may be gained to the interior of the reservoir, the door or closure 2 being hingedly secured as at 3. The bottom 4 of the reservoir 1 slopes toward its center, that is toward the drain opening therein, in order that all of the liquid contained in the reservoir, when the apparatus is in operation, will be drained therefrom. Arranged within the reservoir 1 at one side thereof is a float 5 the same being mounted for vertical movement in a rectangular chamber 6 which snugly receives the same, the lower end of the chamber 6 being open as at 6' so as to establish communication with the interior of the reservoir and whereby liquid contained in said reservoir will assume the same level in said chamber to effect the operation of the float 5. Secured to and upwardly projecting from the float 5 is a stem 7 the upper end of which projects exteriorly through an opening 8 provided in the upper end wall of the reservoir. The front side of the stem 7 is graduated as will be observed, indicating volumes which correspond with the various positions of the float 5 within the reservoir, a stationary hand or indicator 9 being arranged for coöperation with the graduations upon the stem 7. With this arrangement it will be observed that the volume of the liquid contained within the reservoir may at all times be readily ascertained, the graduations registering with the indicator 9 corresponding with the volume of the liquid contained in the reservoir. Arranged at the upper end of the reservoir adjacent the stem 7 is a bell 10 which is mounted upon the upper extremity of the post 11 which is rigidly secured upon the upper end wall of said reservoir. Also secured to the post 11 is a spring arm 12 which carries at its free end a striker or hammer 13 which is adapted when said arm 12 is vibrated to strike the bell 10. Carried by the stem 7 adjacent the upper and lower extremities thereof are projections 14 and 14' which are arranged for engagement with the outer end of the arm 12. The arrangement is such that the arm 12 will be actuated by the projections 14' when the reservoir is nearly full of liquid, the striking of the bell by the hammer 13 when the arm 12 is vibrated by the projections 14' serving as a means of notifying a person who is in the act of filling or replenishing the reservoir. Further, the arrangement is such that when the float 5 is at substantially its lower terminal of movement the projections 14 will engage the arm 12, the sounding of the bell occasioned by the projections 14 contacting the arm 12 serving as a means of notifying the one having charge of the apparatus that the reservoir is empty. Arranged over the bell 10 and the operating mechanism coöperating therewith is a protecting dome 15 preferably of glass which is transparent so that the indicator 9 and graduations upon the stem 7 may be readily discerned. Provided in the upper side of the dome 15 is an opening 7' which permits of free passage for the float stem 7.

Arranged adjacent the reservoir 1 is a liquid dispensing tank 16 which is of less capacity than said reservoir, the same being positioned in a plane below said reservoir in order that liquid contained in the latter may drain by gravity into said dispensing tank when the passage connecting the two is open. Said reservoir and tank are connected by a pipe 17 which communicates at one end with the drain opening in the bottom 4 of said reservoir, the opposite end thereof being connected through the medium of a nipple 17' with the lower end of the tank 16, said nipple 17 registering with the drain opening (the latter also serving as the admission opening) provided in the bottom of said tank. Also communicating with the nipple 17' is a laterally projecting discharge pipe 18 at the outer extremity of which is provided a spigot 18' through which the liquid is discharged when the apparatus is in operation. Provided in the pipes 17 and 18 are valves 19 and 20 respectively which govern respectively the admission of liquid to and the discharge of liquid from the tank 16. The operating stems 21 and 21' of the valves 19 and 20 respectively are operatively connected at their outer ends by a link 22; simultaneous operation of said valves 19 and 20 being thereby secured. Said link 22 further connects the valves 19 and 20 in such a manner that when one is open the other will be closed, said link never permitting of both valves being simultaneously opened or closed. Formed integrally with the stem 21' is a projecting arm 23 at the outer end of which is pivotally connected a vertically disposed rod 24 which carries weights 24' at its upper extremity. The rod 24 is adapted normally to maintain the arm 23 in such a position that the valve 20 shall be open and consequently the valve 19 closed, the position of said valves being reversed when said rod is held at its upper terminal of movement as shown in Figs. 2 and 3. When released from such position said rod will by gravity immediately drop to its lower terminal of movement effecting the corresponding rocking of the arm 23 which in turn effects the reversal of the positions of said valves, that is, the opening of the valve 20 and the closing of the valve 19. With this arrangement then it will be observed that when the arm 24 is in its upper position the valves 19 and 20 will be so positioned as to permit of draining of liquid from the reservoir 1 into the tank 16 in order to fill the latter, and that when said rod is released, occasioning the reversal of the positions of said valves, the flow of liquid from the reservoir to said tank will be discontinued and the discharge or draining of liquid from the tank 16 through the spigot 18' permitted.

Arranged axially within the tank 16 is a rod 25, the lower end of which is rigidly secured in the bottom of said tank, the upper end of said rod projecting through an opening provided in the upper end of said tank, said end projecting considerably above the upper extremity of said tank. Arranged within the tank 16 is a float 26 which is slidably mounted upon said rod 25, the passage through said float being square in cross section to correspond with that of the rod 24 which is similarly formed, such construction evidently preventing rotary movement of said float upon said rod but permitting of free longitudinal movement thereof upon said rod. Secured to the upper side of said float is an upwardly projecting tubular stem 27 which slidably embraces the rod 25, said stem being of such a length that when said float is at its lower terminal of movement in the tank 16 the upper extremity of said stem will project slightly above the upper end of said tank. Arranged upon one of the sides of the stem 27 are vertically spaced projections 28, 28', 28'', 28''' 28'''', and 28''''', the latter being of progressively increasing widths with respect to their positions measured downwardly along the stem as clearly shown in Fig. 3 for a purpose which will be hereinafter fully described. Arranged upon the opposite side of said stem 27 are projections 29 which are all of the same width and equally spaced apart. Formed upon one of the remaining sides of said stem adjacent the upper extremity thereof are projections 30, the functions of these various projections being set forth in the following.

Slidably mounted upon the upper end of the tank 16 adjacent the side of the stem 27 bearing the projections 28, 28', 28'', 28''', 28'''', and 28''''' is a plate 31 the opposite longitudinal edges of which are slidably engaged by guide flanges 32 secured preferably by soldering upon the upper side of said tank. Carried by the plate 31 is a vertically positioned flange or supporting portion 33. Pivoted at 34 upon the front side of the portion 33 adjacent the upper edge thereof is a lever 35 which connects at its outer extremity with the upper end of the rod 24 as clearly shown in Figs. 2 and 3. Slidably mounted upon the front side of the flange 33 below the inner end of the lever 35 is a catch member 36 which is slidably supported upon the headed pins 37 which are preferably in threaded connection with said supporting flange, said catch 36 being longitudinally slotted as at 38 in order to accommodate the pins 37. The inner extremity of the catch 36 is formed for engagement of the hooked inner extremity of the lever 35 as clearly illustrated in Fig. 5, said catch being adapted, when in engagement with said extremity of said lever to maintain the latter in a position in which the rod 24 will be supported at its upper terminal of movement or in the position as shown in Figs. 2 and 3, such position having previously been referred to. A leaf spring 39 having its free end engaging against the outer extremity of the catch 36 is adapted normally to hold said catch in a position for engagement of the inner extremity of said lever 35. The arrangement is such, as will be observed, that when the inner end of the lever 35 is rocked downwardly the same will engage against the inner end of the catch 36 forcing the same outwardly, said catch, when said end of said lever has been rocked to a position below the inner end thereof being automatically forced into engagement therewith to effect the retention of said lever in this position and hence of the rod 24 in its elevated position.

Pivotally mounted as at 40 upon the front side of the supporting flange 33 adjacent the lower end thereof is an angular trigger 41 the upper extremity of which is adapted for engagement with an outwardly projecting pin 42 carried by the catch 36. The arrangement is such that when the opposite or lower end of said trigger is rocked upwardly the upper end of said trigger in rocking outwardly or laterally engaging the pin 42 will effect the outward sliding or forcing of the catch 36 to release the lever 35. The lower end of the trigger 41 terminates in vertical alinement with the projections 28, 28′, 28″, 28‴, 28⁗, and 28⁗′ so that upon upward movement of the float 16 and hence the stem 27 said end of said trigger will be engaged by one of said projections to effect the tripping of the catch 36 in the manner as just described. With this arrangement, however, were the position of the trigger 41 fixed relative to the projections 28, 28′, 28″, 28‴, 28⁗, and 28⁗′ the same would always be engaged by the same projection upon vertical movement of the float stem 27; in other words, the valve operating rod 24 would always be operated at the same position of the float 26 in the tank 16. By slidably mounting the plate 31 as above set forth it will be observed that the trigger 41, through such adjustment of said plate may be adjusted so as to be in position for engagement by any one of said projections, it being understood that said projections are of graduated widths in order that this may be accomplished. In order to facilitate adjustment of said plate 31 as just mentioned a feeding screw 43 is provided which is arranged directly below said plate, the inner end of said screw being in swiveled connection with a stationary bearing 43′, the outer exteriorly positioned extremity thereof being provided with a knurled head 44. Intermediate its ends the screw 43 is in threaded connection with a depending lug 45 secured to the under side of said plate 31, said lug passing through an elongated opening provided for the accommodation thereof in the top of the tank 16. With this arrangement it will be observed that adjustment of the plate 31 and hence of the trigger 41 as and for the purpose described may be readily and expeditiously effected by rotating the head 44 which may be engaged by the fingers.

The projections 28, 28′, 28″, 28‴, 28⁗, and 28⁗′ are spaced upon the stem 27 to correspond with certain customary volumes. More precisely, the projection 28 is preferably so positioned that when a pint of liquid is contained within the tank 16 the float 26 will be elevated to such a position that said projection will be brought into registration with the lower end of the trigger 41 or into a position for effecting actuation of said trigger; the projection 28′ being positioned preferably to similarly correspond with two pints or a quart, the projection 28″ with three pints, the projection 28‴ with four pints or two quarts, the projection 28⁗ with a gallon and the projection 28⁗′ with two gallons. With this arrangement then if it is desired to measure out say one gallon of liquid the screw 43 will be turned so as to adjust the trigger 41 for engagement with the projection 28⁗′; it being clear that when said trigger is so positioned upon a gallon of liquid being introduced into said tank said trigger will be actuated in order to effect the release of the lever 35 and hence the operation of the valves 19 and 20 with the result desired.

In order that the position of the trigger relative to the projections 28, 28′, 28″, 28‴, 28⁗, and 28⁗′ may be readily ascertained when adjusting the screw 43 the following provision is made. A transversely disposed vertically extending flange or supporting plate 46 is screwed upon the upper end of the tank 16 directly in front of the plate 31. Rotatably mounted in said flange 46 is a shaft 47 upon the rearward end of which is carried a gear 48 meshing with a rack 49 secured upon the upper side of the plate 31. With this arrangement it will be seen that movement of the plate 31 as when adjusting the same by the screw 43 will impart rotary movement to the shaft 47. Secured to the forward extremity of the shaft 47 is an indicator 50 which coöperates with graduations 51 arranged upon the front side of the plate or flange 46, said graduations corresponding with the quantities or volumes represented by the projections 28, 28', 28", 28''', 28'''', and 28''''' as above described, that is, the indicator 50 registers with, for instance, the one gallon graduation when the trigger 41 is in a position for engagement by the projection 28'''', or said indicator registers with the two quart graduation when the trigger is positioned for engagement by the projection 28''', and so on. Such a provision is evidently of great advantage since upon determining the amount or quantity of liquid which it is desired to dispense the screw 43 needs only to be adjusted to position the indicator 50 corresponding with that quantity or volume represented upon the plate 46 at 51.

Arranged at the opposite side of the float stem 27 is a lever 52 the outer end of which is pivotally secured at 53 to the upper end of said tank. Provided at the inner or free end of the lever 52 is a finger 54 which is pivotally secured at 55 to said end of said lever, said finger being so arranged that the same is free for downward rocking relative to said lever but upon upward rocking thereof corresponding movement will be imparted to said lever. A leaf spring 56 coöperates with the finger 54 in order to normally maintain the same in an elevated position as shown in Fig. 5. The lever 52 is so arranged that the free extremity of the finger 54 thereof will be engaged by the projections 29 upon upward movement or elevation of the float stem 27 so that, upon upward movement of said stem, said lever 52 will be intermittently rocked. By reason of the pivotal connection of the finger 54 with the lever 52 downward or return movement of the stem 27 will be permitted without effecting actuation, that is rocking, of said lever. Secured to and upwardly projecting from the upper side of the lever 52 is an arm 57 to the upper extremity of which is pivoted a pawl 58 adapted to coöperate with a ratchet 59 carried at the rearward extremity of a shaft 60 which is rotatably mounted in the supporting plate or flange 46, a leaf spring 61 being adapted to normally hold said pawl in engagement with said ratchet. The arrangement is such that upon oscillatory movement of the lever 52 as is caused by engagement of the projections 29 with the finger 54 upon upward movement of the stem 27, the ratchet 59 will be intermittently rotated effecting the corresponding rotation of the shaft 60. A substantially U-shaped bearing member 62 is preferably secured upon the rearward side of the supporting plate or flange 46 in order to serve as a means of supporting the rearward end of the shaft 60. The shaft 60 is operatively connected through a train of reducing gearing 63 with an indicator 64 which is carried upon the forward extremity of a shaft 65, the arrangement being such that intermittent movement of the shaft 60 as above described will effect a corresponding rotary movement of less amplitude of said indicator 64. Arranged upon the front side of the plate 46 are graduations 66 which represent liquid volumes, the mechanism last described being evidently adapted to serve in the capacity of a register, the quantity of liquid dispensed from the tank being indicated by the indicator 64 coöperating with the graduations 66.

Mounted upon the upper end of the tank 16 rearward of the stem 27 or adjacent the side thereof bearing the projections 30 is a bearing bracket 67 in which is pivotally mounted an arm 68. The rearward end of the arm 68 terminates in a spring 68' which carries a striker or hammer 69. Arranged adjacent the striker 69 is a bell 70 which is mounted upon the upper extremity of a post 71 upon the upper end of the tank 16. The arrangement is such that when the arm 68 is oscillated the striker 69 will be vibrated to effect the sounding of the bell. Also pivoted to the upper end of the bracket 69 is an arm 72 which carries a lateral projection 73 (see Fig. 4) which engages against the upper side of the adjacent end of the arm 68, the arrangement being such that said arm 72 will impart oscillatory movement to the arm 68 only when said arm 72 is rocked downwardly, the latter being free or independent of the arm 68 when rocked upwardly. The free end of the arm 72 terminates in the path of the projections 30 of the float stem 27, the arrangement being such that when said stem is moving downwardly and is adjacent its lower terminal of movement the projections 30 will engage and oscillate the arm 72 which will in turn effect the vibration of the striker 69 and hence the sounding of the bell 70. With this arrangement then it will be observed that notice will be given to the operator attendant when the tank 16 is empty, said bell not being sounded when said stem 27 is moved upwardly because of the peculiar connection of the arm 72 with the arm 68.

Surrounding the upper end of the tank 16 is a transparent glass dome 73 which serves as a protector for the mechanism arranged upon the upper end of said tank, the upper end of said dome being provided with an opening 74 to permit of the passage of the float stem 27. An opening 75 is also provided in one side of the dome 73 to accommodate the lever 35.

In operation liquid is first introduced into the reservoir 1 through the closure 2, the rod 24 being permitted to remain in its lowermost or normal position since the valve 19 in this position is closed, as will be recalled. When it is desired to draw liquid, after determining the quantity which is to be drawn the screw 43 is operated to effect the proper positioning of the indicator 50 and hence the trigger 41. After such adjustment has been made the rod 24 is raised by the hand to its uppermost position, in which position the same will be held by the catch 36 as before described. Upon said rod being so elevated the valve 19 will be open and hence the valve 20 closed. This being so, the liquid will drain from the reservoir 1 into the tank 16 until a quantity has been introduced which corresponds with the quantity indicated by the indicator 50. Upon this quantity being introduced into the tank the rod 24 will be released thereby effecting the closing of the valve 19 and the opening of the valve 20, this taking place the introduction of liquid into the tank 16 is discontinued and the liquid already introduced therein will be discharged through the spigot 18' into a receptacle arranged below the same. Thus the liquid is automatically measured and dispensed. The remaining details of construction and their operations and functions have been made clear by the foregoing description and no further elucidation need here be given.

A liquid measuring and registering apparatus of a construction as set forth is durable and economical, and the same is of great efficiency in operation.

While I have illustrated and described the preferred construction for carrying my invention into effect this is capable of variation and modification without departing from the spirit of the invention. I, therefore, do not wish to be limited to the precise details of construction as set forth but desire to avail myself of such variations and modifications as come within the scope of the appended claims.

Having described my invention what I claim as new and desire to secure by Letters Patent is:

1. In an apparatus of the character described, a liquid dispensing tank; outlet and inlet valves for said tank; means for holding said outlet valve normally open and said inlet valve normally closed; a catch for holding said means in position to maintain said outlet valve closed and said inlet valve open; a float in said tank; and an operative connection between said float and said catch arranged to release said means when said float reaches a predetermined elevation, substantially as described.

2. In an apparatus of the character described, a liquid dispensing tank; outlet and inlet valves for said tank; means for holding said outlet valve normally open and said inlet valve normally closed; a catch for holding said means in position to maintain said outlet valve closed and said inlet valve open; a float in said tank; and an adjustable operative connection between said float and said catch arranged to release said means when said float reaches predetermined elevations, substantially as described.

3. In an apparatus of the character described, a liquid dispensing tank; outlet and inlet valves for said tank; means for holding said outlet valve normally open and said inlet valve normally closed; an adjustable catch for holding said means in position to maintain said outlet valve closed and said inlet valve open; a float in said tank; an upwardly projecting stem on said float; and projections on said stem arranged to operate said catch to release said means, said projections being progressively increasing in widths with respect to their positions measured downwardly on said stem, substantially as described.

4. In an apparatus of the character described, a liquid dispensing device comprising a tank; liquid inlet and outlet pipes for said tank; valves controlling said inlet and outlet pipes; an operative connection between said valves whereby, when one is open the other will be closed; valve operating means adapted normally to hold said inlet governing valve in closed position and hence said outlet governing valve in open position; a catch for releasably holding said last mentioned means in a position in which the above mentioned positions of said valves are reversed; a float mounted in said tank; and means adapted when said float is elevated to trip said catch to effect the release of said valve operating means, substantially as described.

5. In an apparatus of the character described, a liquid dispensing device comprising a tank; liquid inlet and outlet pipes for said tank; valves controlling said inlet and outlet pipes; an operative connection between said valves whereby, when one is open the other will be closed; valve operating means adapted normally to hold said inlet governing valve in closed position and hence said outlet governing valve in open position; a catch for releasably holding said last mentioned means in a position in which the above mentioned positions of said valves are reversed; a float mounted in said tank; a plurality of tripping means adapted, when said float is elevated, to trip said catch so as to effect the release of said valve operating means; and means for adjusting said catch relative to said tripping means whereby said catch may be tripped when said float is at any desired predetermined elevation in said tank, substantially as described.

6. In an apparatus of the character described, a liquid dispensing device comprising a tank; liquid inlet and outlet pipes for said tank; valves controlling said inlet and outlet pipes; an operative connection between said valves whereby, when one is open the other will be closed; valve operating means adapted normally to hold said inlet governing valve in closed position and hence said outlet governing valve in open position; an adjustably mounted catch for releasably holding said last mentioned means in a position in which the above mentioned positions of said valves are reversed; a float mounted in said tank; a plurality of vertically spaced projections movable with said float, said projections being adapted to engage said catch to effect the tripping thereof when said float is elevated, said projections being of graduated widths; and manually operable means for adjusting said catch relative to said projections whereby the same may be positioned for engagement by any one of said projections desired, substantially as described.

7. In an apparatus of the character described, a liquid dispensing tank; outlet and inlet valves for said tank; an operative connection between said valves arranged to throw said outlet valve to open position when said inlet valve is closed and vice versa; a weighted rod connected to hold said outlet valve normally open; a slidable support; a lever pivoted on said support and to said rod; a catch on said support arranged to engage said lever and hold said rod in elevated position; a float in said tank; an upwardly extending stem on said float; and projections on said stem arranged to operate said catch to release said rod, said projections being progressively increasing in widths with respect to their positions measured downwardly along the stem, substantially as described.

8. In an apparatus of the character described, a liquid dispensing tank; outlet and inlet valves for said tank; an operative connection between said valves arranged to throw said outlet valve to open position when said inlet valve is closed and vice versa; a weighted rod connected to hold said outlet valve normally open; a slidable support; a lever pivoted on said support and to said rod; a catch on said support arranged to engage said lever and hold said rod in elevated position; a rack bar on said support; a gear meshing with said rack bar; an indicator finger arranged to be operated by said gear; a float in said tank; an upwardly extending stem on said float; and projections on said stem arranged to operate said catch to release said rod, said projections being progressively increasing in widths with respect to their positions measured downwardly along the stem, substantially as described.

In testimony whereof I have signed my name to this specification in the presence of two subscribing witnesses.

GOTTLIEB NEUDECKER.

Witnesses:
WILLIAM ROBERTS,
ALFRED PATERSON.